(12) United States Patent
Mills et al.

(10) Patent No.: US 11,396,140 B2
(45) Date of Patent: Jul. 26, 2022

(54) METHOD OF MANUFACTURING A MOULDED ARTICLE

(71) Applicant: CRANFIELD UNIVERSITY, Cranfield (GB)

(72) Inventors: Andrew Mills, Syresham (GB); Aurele Bras, Saint-Brieuc (FR)

(73) Assignee: Cranfield University

( * ) Notice: Subject to any disclaimer, the term of this patent is extended or adjusted under 35 U.S.C. 154(b) by 105 days.

(21) Appl. No.: 16/650,749

(22) PCT Filed: Sep. 24, 2018

(86) PCT No.: PCT/GB2018/052705
§ 371 (c)(1),
(2) Date: Mar. 25, 2020

(87) PCT Pub. No.: WO2019/063980
PCT Pub. Date: Apr. 4, 2019

(65) Prior Publication Data
US 2021/0197425 A1     Jul. 1, 2021

(30) Foreign Application Priority Data

Sep. 26, 2017 (GB) .................................. 1715577

(51) Int. Cl.
*B29C 70/08* (2006.01)
*B29C 43/20* (2006.01)
(Continued)

(52) U.S. Cl.
CPC .......... *B29C 70/081* (2013.01); *B29C 31/008* (2013.01); *B29C 43/18* (2013.01);
(Continued)

(58) Field of Classification Search
CPC ................ B29C 43/206; B29C 43/183; B29C 2043/3602; B29C 45/14073;
(Continued)

(56) References Cited

U.S. PATENT DOCUMENTS 4,236,954 A * 12/1980 Edwards ................... B65C 9/14
156/352
4,713,032 A * 12/1987 Frank ....................... B29C 51/10
441/74
(Continued)

FOREIGN PATENT DOCUMENTS

DE  17 04 194 A1   3/1971
GB  1 052 773      12/1966
JP  2016 203419 A  12/2016

OTHER PUBLICATIONS

International Search Report dated Jan. 7, 2019 for International application No. PCT/GB2018/052705.
(Continued)

Primary Examiner — Benjamin A Schiffman
(74) Attorney, Agent, or Firm — Fay Sharpe LLP (57) ABSTRACT

A method of manufacturing a moulded article from first and second moulding compounds includes attaching a first moulding component to a carrier tool, placing the carrier tool and the attached first moulding component in a mould, applying a first moulding process, removing the carrier tool, placing a second moulding component in the mould, and applying a second moulding process to shape the first and second moulding components and bond the first moulding component to the second moulding component. A moulded article is also disclosed.

24 Claims, 6 Drawing Sheets

(51) Int. Cl.
*B29C 43/34* (2006.01)
*B29C 45/14* (2006.01)
*B29C 70/34* (2006.01)
*B29C 31/00* (2006.01)
*B29C 43/18* (2006.01)
*B29C 43/52* (2006.01)
*B29K 105/08* (2006.01)
*B29K 105/12* (2006.01)
*B29K 105/24* (2006.01)
*B29C 43/36* (2006.01)
*B29C 37/00* (2006.01)
*B29C 49/20* (2006.01)
*B29C 70/46* (2006.01)
*B29C 70/54* (2006.01)
*B29C 70/50* (2006.01)
*B29C 70/18* (2006.01)

(52) U.S. Cl.
CPC ............ B29C 43/206 (2013.01); B29C 43/34 (2013.01); B29C 45/14221 (2013.01); B29C 45/14786 (2013.01); B29C 70/08 (2013.01); B29C 70/345 (2013.01); B29C 37/0032 (2013.01); B29C 43/183 (2013.01); B29C 43/52 (2013.01); B29C 45/14073 (2013.01); B29C 70/18 (2013.01); B29C 70/46 (2013.01); B29C 70/502 (2013.01); B29C 70/541 (2013.01); B29C 70/543 (2013.01); B29C 2037/0042 (2013.01); B29C 2037/0046 (2013.01); B29C 2043/3405 (2013.01); B29C 2043/3483 (2013.01); B29C 2043/3602 (2013.01); B29C 2045/1404 (2013.01); B29C 2045/14049 (2013.01); B29C 2049/2078 (2013.01); B29K 2105/08 (2013.01); B29K 2105/0872 (2013.01); B29K 2105/0881 (2013.01); B29K 2105/12 (2013.01); B29K 2105/128 (2013.01); B29K 2105/243 (2013.01)

(58) Field of Classification Search
CPC .......... B29C 2049/2078; B29C 70/502; B29C 70/46; B29C 70/543; B29C 70/541; B29C 2043/3483; B29C 2045/1404; B29C 2045/14049; B29C 31/008; B29C 37/0032; B29C 2037/0042; B29C 2037/0046

USPC ........................... 264/261, 262, 257
See application file for complete search history.

(56) References Cited

U.S. PATENT DOCUMENTS

| | | | | |
|---|---|---|---|---|
| 4,875,962 | A * | 10/1989 | Breakspear | B29C 70/30 156/289 |
| 4,891,176 | A * | 1/1990 | Drysdale | B29C 70/865 264/261 |
| 5,092,954 | A * | 3/1992 | Braun | B29C 66/81422 156/247 |
| 5,139,405 | A * | 8/1992 | Krone | B29C 70/46 425/406 |
| 5,209,880 | A * | 5/1993 | Miwa | B29C 66/8322 264/479 |
| 5,401,457 | A * | 3/1995 | Valyi | B29C 45/14008 264/513 |
| 5,427,518 | A * | 6/1995 | Morizot | B29C 70/38 100/211 |
| 5,527,173 | A * | 6/1996 | Miller | B29C 45/14008 425/588 |
| 6,464,922 | B1 * | 10/2002 | Bogdan | B29C 37/001 264/277 |
| 6,495,086 | B1 * | 12/2002 | Uytterhaeghe | B29C 70/541 264/322 |
| 6,682,819 | B2 * | 1/2004 | Damo | B29C 45/14196 428/313.5 |
| 6,990,723 | B1 * | 1/2006 | Hoogland | B29C 45/14008 264/153 |
| 9,561,638 | B2 * | 2/2017 | Jeunesse | B32B 5/02 |
| 10,035,373 | B2 * | 7/2018 | Yoshimoto | B44C 1/10 |
| 10,232,584 | B2 * | 3/2019 | Tanji | B32B 27/32 |
| 11,161,311 | B2 * | 11/2021 | Boyer | B32B 7/022 |
| 11,203,136 | B2 * | 12/2021 | Hirawaki | B29C 70/542 |
| 2005/0287241 | A1 * | 12/2005 | Rudolph | B29C 31/008 425/503 |
| 2020/0114594 | A1 * | 4/2020 | Ota | B29C 70/46 |
| 2021/0060882 | A1 * | 3/2021 | Shah | B29C 70/305 |
| 2022/0048268 | A1 * | 2/2022 | Baldinger | B29C 37/0032 |

OTHER PUBLICATIONS

Written Opinion of the International Searching Authority dated Jan. 7, 2019 for International application No. PCT/GB2018/052705.
International Preliminary Report on Patentability dated Mar. 31, 2020 for International application No. PCT/GB2018/052705.

* cited by examiner

Fig. 6
final carbon fibre moulded article

Fig. 7
carrier tool with UD

METHOD OF MANUFACTURING A MOULDED ARTICLE

The present invention relates to a method of manufacturing a moulded article from first and second moulding compounds, wherein each of said moulding compounds comprises a polymer and a fibre reinforcing material embedded within the polymer. The invention also relates to a moulded article, and to a moulded article made by a method of manufacturing as defined herein.

In particular, but not exclusively, the invention relates to a method of manufacturing a moulded article by compression moulding, wherein the first moulding compound includes a directional fibre reinforcing material and the second moulding compound includes a non-directional fibre reinforcing material.

It has been known for many years to manufacture moulded articles using composite materials comprising a polymeric matrix material, such as a thermosetting resin, and a fibre reinforcing material that is embedded within the matrix. Such composite materials include for example glass fibre composite materials, wherein a glass fibre mat is embedded within an epoxy resin.

Products made using these composite materials are characterised generally by having high strength and low weight, as well as being easily moulded. It is also well known to use other materials within the composite, including for example various thermosetting resins for the matrix, and reinforcing fibres made of carbon, glass, metal or natural fibres.

In a known compression moulding process, the moulding compound is supplied in a laminar form, known as sheet moulding compound (SMC), which includes a fibre reinforcing material, for example carbon fibre, embedded within a thermosetting resin. This product may be moulded by placing the SMC sheet in a mould and subjecting it to heat and pressure. This forms the sheet into the desired shape and simultaneously cures the thermosetting resin, thereby fixing the shape of the moulded article. This process can be automated making it suitable for the mass production of moulded articles.

The SMC material generally includes a chopped fibre reinforcing material, wherein the reinforcing fibres are oriented randomly within the moulded article. The moulded article therefore has approximately equal strength in all directions. This is ideal for many moulded products, but for certain products, particularly where strength and low weight are critical, it may be preferable to have an increased strength and/or rigidity in one direction. Such directional properties are particularly desirable for example in components used in the automobile and aerospace industries.

Directional strength can be achieved by the use of directional moulding compounds, in which the reinforcing fibres are continuous and extend preferentially in one or more primary reinforcing directions. These directional moulding compounds include pre-impregnated composite materials (so-called "pre-preg" materials) that include a fibrous reinforcing material, for example in the form of a weave or parallel strands, and a thermoset polymeric matrix material that is impregnated into the reinforcing material. The polymeric matrix material may be partially cured to allow easier handling. These directional moulding compounds include uni-directional (UD) moulding compounds, in which the reinforcing fibres all run in a single direction substantially parallel to a primary reinforcing axis. In the case of a weave, the material may have two perpendicular primary reinforcing directions, parallel to the warp and weft fibres. Directional moulding compounds are available in various laminar forms, including for example sheets and tapes.

However, directional continuous fibre reinforcing materials tend to be very much more expensive than non-directional materials such as SMC. This precludes their use in certain applications.

It has been proposed to use a combination of uni-directional and non-directional moulding compounds in order to provide a high-directional strength while avoiding some of the additional cost resulting from the use of uni-directional materials. However, in practice it has been found that when directional and non-directional moulding compounds are moulded together for example by compression moulding, material flow within the mould disrupts the placement of the directional fibres. The fibres are then unable to provide the directional strength that is required. This results in the technical problem that these materials are unable to provide the required combination of strength, low weight and reasonable cost.

It is an objective of the present invention to provide a method of manufacturing a moulded article, which mitigates one or more of the aforesaid problems.

According to one aspect of the present invention there is provided a method of manufacturing a moulded article from first and second moulding compounds, wherein:

the first moulding compound comprises a first polymer and a first fibre reinforcing material embedded within the first polymer, wherein the first fibre reinforcing material is a directional fibre reinforcing material that includes a plurality of reinforcing fibres that extend preferentially in at least one primary reinforcement direction within the first moulding compound, and the second moulding compound comprises a second polymer and a second fibre reinforcing material embedded within the second polymer, wherein the second fibre reinforcing material is a non-directional fibre reinforcing material that includes a plurality of reinforcing fibres that extend in multiple directions within the second moulding compound, the method comprising:

attaching a first moulding component to a carrier tool, said first moulding component comprising said first moulding compound, placing the carrier tool and the attached first moulding component in a mould comprising first and second mould parts that are configurable in opened and closed configurations, wherein a mould cavity is defined between the first and second mould parts in the closed configuration, closing the mould and applying a first moulding process so that the first moulding component adheres to the first mould part, opening the mould and removing the carrier tool while leaving the first moulding component adhered to the first mould part, either (i) placing a second moulding component in the mould, said second moulding component comprising said second moulding compound, then closing the mould, or (ii) closing the mould, then injecting a second moulding component into the mould, said second moulding component comprising said second moulding compound, applying a second moulding process to shape the first and second moulding components to the mould cavity, and bond the first moulding component to the second moulding component to form a moulded article, and opening the mould and removing the moulded article.

The invention provides a method of co-moulding a directional moulding compound and a non-directional moulding compound without disturbing the placement of the reinforcing fibres in the directional moulding compound. A moulded article made by the method may thus have a body component made of the non-directional moulding compound and one or more reinforcing elements on the surface of the body component that are made of the directional moulding compound. The moulded article can therefore have directional strength/rigidity properties. The method utilises the advantages of directional materials, but uses those materials only where they are required, to minimise material costs. The method is also capable of being automated or semi-automated, thus allowing the use of mass production techniques.

In an embodiment the method comprises:
attaching first moulding components to opposite sides the carrier tool, each of said first moulding components comprising said first moulding compound,
placing the carrier tool and the attached first moulding components in the mould, closing the mould and applying the first moulding process so that at least one first moulding component adheres to the first mould part and at least one first moulding component adheres to the second mould part,
opening the mould and removing the carrier tool while leaving the first moulding components adhered to the first and second mould parts, and
either (i) placing the second moulding component in the mould, then closing the mould, or (ii) closing the mould, then injecting a second moulding component into the mould, said second moulding component comprising said second moulding compound,
applying the second moulding process to shape the first and second moulding components to the mould cavity and bond the first moulding components to opposite sides of the second moulding component to form a moulded article, and
opening the mould and removing the moulded article.

This option allows the production of moulded articles with a body component made of the non-directional moulding compound and reinforcing elements on opposite sides of the body component that are made of the directional moulding compound. The moulded article can therefore have even greater directional strength/rigidity properties.

Optionally, the first moulding component is substantially laminar and may be supplied for example in the form of a tape or sheet.

Optionally, the first moulding compound includes a unidirectional fibre reinforcing material comprising a plurality of reinforcing fibres that extend substantially parallel to a primary reinforcement direction.

Optionally, the first fibre reinforcing material includes continuous reinforcing fibres having a length of at least 20 mm.

Optionally, the moulded article is formed using a compression moulding process.

Optionally, the second moulding component is substantially laminar and may be supplied for example in the form of a sheet. Alternatively, the second moulding component may be supplied for example in the form of bulk moulding compound (BMC).

Optionally, the second moulding component comprises a sheet moulding compound.

Alternatively, the moulded article may be formed using an injection moulding process. In this case the second moulding compound may be an injectable moulding compound, consisting for example of granules or pellets.

Optionally, the second moulding compound includes reinforcing fibres having a fibre length in the range of 1-100 mm.

Optionally, the first and second polymers comprise thermoset polymers.

Optionally, the first moulding process partially cures the first moulding compound and the second moulding process fully cures the first and second moulding compounds. This ensures chemical cross-linking between the two polymers, thus ensuring a strong bond between the first and second moulding compounds. Partially curing the first moulding compound helps it adhere to the mould. It also increases the stiffness and cohesiveness of the first moulding component, which helps it to retain its shape, thus ensuring that the fibres remain correctly aligned during the second stage of the moulding process, in which the second moulding compound is shaped and cured within the mould cavity.

Alternatively, the first moulding process fully cures the first moulding compound and the second moulding process fully cures the second moulding compound. In this case the second moulding process fully cures only the second moulding compound, as the first moulding compound has already been fully cured. Chemical cross-linking between the two polymers cannot then take place, which may result in a slightly less strong bond between the first and second moulding compounds. However, this bond may still be entirely adequate in some applications.

Optionally, the first moulding process comprises a first combination of temperature $T_1$, pressure $P_1$ and time $t_1$ and the second moulding process comprises a second combination of temperature $T_2$, pressure $P_2$ and time $t_2$.

Optionally, $T_1=T_2$. This avoids the need to adjust the temperature of the mould between the first and second moulding processes.

Optionally, $P_1=P_2$. This avoids the need to adjust the compression pressure of the mould between the first and second moulding processes.

Optionally, $t_2=m \cdot t_1$ where m is in the range 1.5-10, preferably 2-5.

Alternatively, the first and second polymers may comprise thermoplastic polymers. Optionally, the method includes heating the first and second polymers before placing the first and second polymers in the mould.

Optionally, the carrier tool comprises an elastomeric material, for example a silicone rubber.

Optionally, the carrier tool is shaped to fit at least a part of the mould cavity, to ensure that it is correctly located within the mould.

Optionally, the carrier tool has a thickness that is equal to or greater than the height of the mould cavity at the location of the carrier tool, so that the carrier tool is compressed within the mould cavity when the mould is in a closed configuration.

Optionally, the method includes placing auxiliary components of the moulded article in the mould after removing the carrier tool and before placing the second moulding component in the mould. This allows auxiliary component such a fixings or fittings, that may be made for example of metal or other materials, to be incorporated into the moulded article.

According to another aspect of the present invention there is provided a method of manufacturing a moulded article from first and second moulding compounds, comprising attaching a first moulding component to a carrier tool, placing the carrier tool and the first moulding component in a mould, applying a first moulding process, removing the carrier tool, placing a second moulding component in the mould, and applying a second moulding process to shape the first and second moulding components and bond the first moulding component to the second moulding component.

According to another aspect of the present invention there is provided a moulded article comprising a main body and at least one reinforcing element applied to a surface of the main body and co-moulded therewith, wherein the moulded article is made by a method of manufacturing as set out in one or more of the preceding statements of invention.

According to yet another aspect of the present invention there is provided a moulded article comprising a main body and at least one reinforcing element applied to a surface of the main body and co-moulded therewith, wherein:

the reinforcing element is made from a first moulding compound that comprises a first polymer and a first fibre reinforcing material embedded within the first polymer, wherein the first fibre reinforcing material is a directional fibre reinforcing material that includes a plurality of reinforcing fibres that extend preferentially in a primary reinforcement direction within the first moulding compound, and the main body is made from a second moulding compound that comprises a second polymer and a second fibre reinforcing material embedded within the second polymer, wherein the second fibre reinforcing material is a non-directional fibre reinforcing material that includes a plurality of reinforcing fibres that extend in multiple directions within the second moulding compound.

An embodiment of the invention will now be described, by way of example, with reference to the accompanying drawings, wherein:

FIG. 2a is an isometric view of a known metal article;

FIGS. 2b and 2c are isometric views of a moulded article that is designed as a substitute for the metal article shown in FIG. 2a, wherein FIG. 2c shows a cutaway portion of the article shown in FIG. 2b;

FIGS. 3a and 3b show the moulded article of FIG. 2b, wherein FIG. 3b shows part of the moulded article at an enlarged scale and partially cut away;

FIGS. 1a to 1f illustrate the steps of a manufacturing process for manufacturing a moulded article according to an illustrative embodiment of the invention. In this embodiment the moulded article is manufactured using a compression moulding technique and thermosetting polymer. However, it should be understood that the invention is not limited to compression moulding and may also be applicable to other moulding methods including, for example, injection moulding. The manufacturing process is also applicable to the use of thermoplastic polymers.

The mould 2 illustrated in FIGS. 1a to 1f comprises first and second mould parts 4a, 4b which in this embodiment constitute an upper mould platen 4a and a lower mould platen 4b. The first and second mould parts are configured for movement between an opened configuration shown in FIGS. 1a, 1c, 1d and 1f and a closed configuration shown in FIG. 1e. The mould 2 is shown in a partially closed configuration in FIG. 1b.

Figure 1:
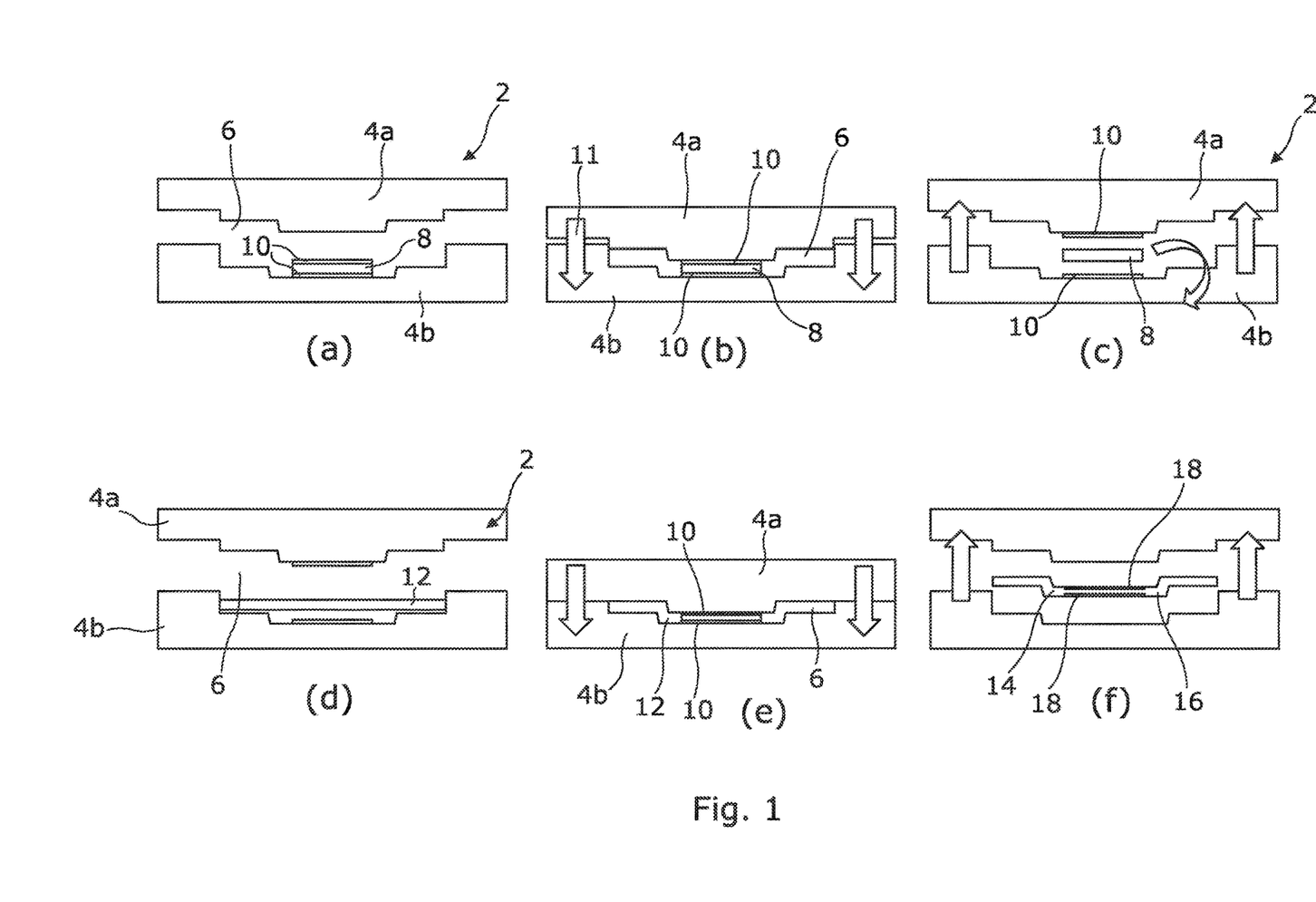
FIGS. 1a to 1f are schematic diagrams illustrating a method of manufacturing a moulded article.

When the mould 2 is in the closed configuration, a mould void 6 is provided between the first and second mould parts 4a, 4b, as illustrated in FIGS. 1b and 1e.

An actuator (not shown), for example a hydraulic ram, is provided for moving the mould parts 4a, 4b between the open and closed configurations. The mould parts may for example be made of metal (for example aluminium or stainless steel), and they may include electrical heating elements for heating the mould 2 to the desired moulding temperature. The mould 2 may also include one or more ejector pins (not shown) for ejecting a moulded article from the mould void, as is well known in the art.

In this embodiment the first mould part 4a comprises a male mould platen and the second mould part 4b comprises a female mould platen that receives the male mould platen when the mould 2 is in the closed configuration. However, it should be understood that the relative positions of the male and female mould platens may be reversed or the mould 2 may take some other form as is known in the art.

The manufacturing process includes a first step, illustrated in FIG. 1a, in which a carrier tool 8 with one or more attached first moulding components 10 is placed in the mould cavity 6 in a predetermined position, while the mould 2 is in an open configuration.

Figure 7:
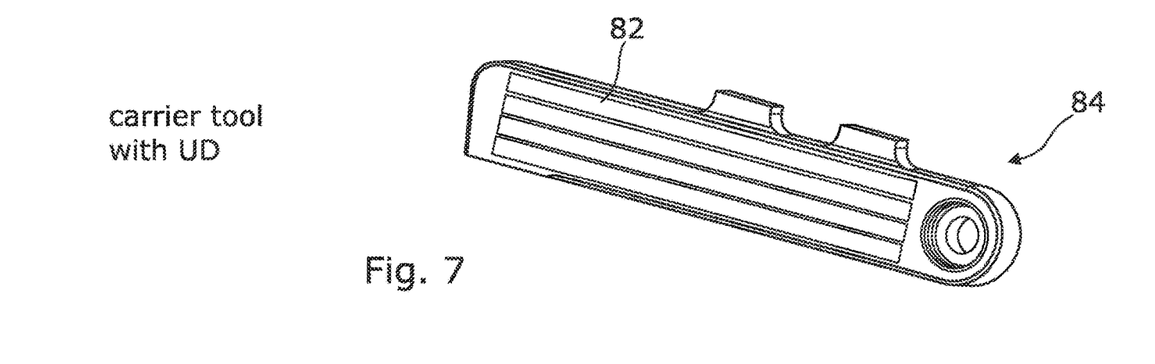
FIG. 7 is an isometric view of a carrier tool carrying the unidirectional fibre reinforcing element.

The carrier tool 8 is usually shaped to fit at least a part of the mould cavity and may for example consist of an elastomeric sheet, made of silicone rubber or another suitable material that is preferably chemically inert and resistant to temperatures in the range encountered in the moulding process (typically up to about 200 C for thermoset polymers). The carrier tool 8 may also optionally have surface markings or formations to aid the correct positioning of the first moulding components 10 on the upper and/or lower surfaces of the carrier tool 8. An exemplary carrier tool 8 is shown in FIG. 7 and is described below.

The first moulding components 10, which are attached to the upper and/or lower surfaces of the carrier tool 8, are made from a first moulding compound comprising a first fibre reinforced thermoset polymer. The first fibre reinforced polymer comprises a first thermoset polymer as a matrix material and a directional fibre reinforcing material that is embedded in the first thermoset polymer.

The term "directional fibre reinforcing material" as used herein means a reinforcing material that includes a plurality of reinforcing fibres that extend preferentially in at least one primary reinforcement direction. The directional moulding compound may for example consist of a pre-impregnated composite material (a "pre-preg") that include a fibrous reinforcing material, for example in the form of a weave or parallel strands, and a thermoset polymeric matrix material that is impregnated into the reinforcing material. In the case of a woven reinforcing material, the material may have two perpendicular primary reinforcing directions, parallel to the warp and weft. Alternatively, the directional fibre reinforcing material may be a uni-directional fibre reinforcing material, in which the reinforcing fibres extend substantially parallel to a primary reinforcement direction.

The first fibre reinforcing material may for example contain carbon fibres, which are preferably continuous fibres. The fibres may for example have a length of at least 20 mm and may be much longer, for example up to 1000 mm or possibly more. Other types of reinforcing fibre may also be used, including for example aramid, glass, metal, ultra-high molecular weight polyethylene, or natural fibres. The polymer that forms the matrix of the fibre reinforced polymer may for example be a thermoset resin such as epoxy resin, or any other suitable thermoset polymer, such as polyester or vinyl ester. The polymer may alternatively comprise a thermoplastic polymer, for example nylon. The matrix material may also include one or more additives or fillers, for example silica, rubber, or carbon nanotubes.

As an example we have used AS4 carbon fibres from Hexcel with M77 resin, also from Hexcel. The first moulding components are preferably provided in a laminar form, consisting for example of sheets or tapes. The resin is naturally sticky, allowing the first moulding components 10 to be attached to the surface of the carrier tool 8, simply by applying pressure. Alternatively, a low tack adhesive may be used if required, which has sufficient strength to retain the first moulding components in position on the surface of the carrier tool 8, but which also allows the carrier tool 8 to be removed easily from the first moulding components 10 during subsequent steps of the moulding process.

It should be noted that the first moulding components 10 are positioned on the carrier tool 8 such that when the mould 2 is closed the first moulding components 10 contact the inner faces of the first and second mould parts 4a, 4b in the positions where they are required to be located in the final moulded article. The carrier tool 8 therefore generally has a thickness that is either approximately equal to the separation of the mould parts 4a, 4b at the location of the carrier tool, or slightly greater than the separation of the mould parts if the carrier tool is made of an elastomeric material that can be compressed.

The next step of the manufacturing process is illustrated in FIG. 1b. A first moulding process is applied in which the mould 2 is closed and pressure is applied to the upper mould part 4a as indicated by arrows 11, forcing the first and second mould parts 4a, 4b towards one another. This compresses the carrier tool 8 within the mould cavity 6, and presses the first moulding components 10 against the inner surfaces of the first and second mould parts 4a, 4b.

The mould 2 has already been pre-heated to the desired moulding temperature, for example 150 C. Therefore, when the mould 2 is closed and the first moulding components come into contact with the heated mould, the thermoset polymer starts to cure. The mould 2 may be held closed only for long enough for the polymer to partially cure, for example for a time of about one minute, and the mould is then opened as illustrated in FIG. 1c.

In this example the first moulding process comprises a combination of temperature $T_1$, pressure $P_1$ and time $t_1$, which together are sufficient to cause partial curing of the first polymer.

Because the first moulding components 10 have been partially cured they stick to the first and second mould parts 4a, 4b, allowing the carrier tool 8 to be removed from the mould, as illustrated in FIG. 1c. This leaves the first moulding components 10 attached to the first and second mould parts 4a, 4b in the required positions.

The next step of the manufacturing process is illustrated in FIG. 1d. With the mould 2 in an open configuration, a second moulding component 12 is placed within the mould cavity 6 between the first and second mould parts 4a, 4b. The second moulding component 12 may be made for example from a second moulding compound, which comprises a second polymer and a second fibre reinforcing material embedded within the second polymer. The second fibre reinforcing material is a non-directional fibre reinforcing material, which includes a plurality of reinforcing fibres that extend in multiple directions (for example, substantially homogeneously) within the moulding compound. The second fibre reinforcing may for example contain carbon fibres, which preferably have a length in the range of 1-100 mm. Alternatively, other types of fibres may be used including for example aramid, glass, metal, ultrahigh molecular weight polyethylene or natural fibres. The second polymer may be a thermoset resin such as epoxy, or any other suitable thermoset polymer, such as polyester or vinyl ester. The second thermoset polymer may be identical to the first thermoset polymer. Alternatively, it may be possible to use a thermoplastic polymer, for example nylon. The matrix material may also include one or more additives or fillers, for example silica, rubber or carbon nanotubes.

The second moulding component is preferably provided in a laminar form, for example as a sheet moulding compound (SMC), which is shaped to fit within the mould cavity 6. As an example, we have used HexMC M77 sheet moulding compound from Hexcel. Alternatively, it may be possible to substitute a bulk moulding compound.

Optionally if auxiliary components, for example fittings made of metal or other materials, are to be included in the moulded article, for example to allow the mould article to be attached to other components, the auxiliary components may be positioned within retaining formations in the upper and/or lower mould parts 4a, 4b before the second moulding component 12 is introduced into the mould cavity 6, so that they are integrated into the moulded article.

In the next step of the process, as illustrated in FIG. 1e, the mould 2 is closed and pressure is applied to the first mould part 4a, so that it is pressed towards the second mould part 4b. The second moulding component 12 is heated and shaped by the pressing operation, so that it fills and takes the shape of the mould cavity 6.

As the first moulding components 10 are attached to the first and second mould parts 4a, 4b, they remain fixed in the required positions and are not disturbed by any movement of the second moulding compound during the pressing process.

The mould 2 is maintained in the closed configuration for sufficient time to allow the first and second polymers to cure completely, and to allow cross linking between the first and second polymers, so that the directional moulding components 10 are bonded to the surfaces of the non-directional moulding component 12, thereby forming the moulded article 14.

Finally, as illustrated in FIG. 1f, the mould 2 is opened and the moulded article 14 is removed from the mould. If necessary, the moulded article may be finished for example by removing any flashing that has formed. The moulded article 14 includes a main body component 16 that is made of sheet moulding compound, and directional reinforcing elements 18 on one or both sides of the moulded article 14, to provide increased strength and stiffness to the moulded article 14 in selected locations.

In the method described above, reinforcing elements 18 are provided on both sides of the main body 16 of the moulded article 14. It should be noted that alternatively a reinforcing element or elements may be provided on only one side of the main body 16, according to the strength and stiffness requirements of the moulded article 14. In this case, a first moulding component 10 may be attached to only one side of the carrier tool 8 before the carrier tool 8 is placed in the mould cavity 6. This may be either the upper side or the lower side of the carrier tool 8. After attaching the first moulding component to the carrier tool 8, the manufacturing process proceeds as described above.

In the manufacturing process described above, the first moulding component is only partially cured in the first moulding process. Alternatively, the first moulding process may comprise a combination of temperature $T_1$, pressure $P_1$ and time $t_1$, which together are sufficient to fully cure the first polymer. For example, the time $t_1$ and/or the temperature $T_1$ may be increased to allow full curing. This will ensure that there is no movement of the reinforcing fibres in the first moulding component during subsequent steps of the manufacturing process, for example during the second moulding process, when the second moulding component is formed and cured.

If the first moulding component is fully cured in the first moulding process, cross-linking will not take place between the first and second moulding components during the second moulding process. As a result, the bond between the first and second moulding components may be less strong than when the first moulding component is only partially cured in the first moulding process. However, in some applications, the bond between the first and second moulding components may still be entirely adequate. Therefore, for some applications, this modified process will be suitable and may provide advantages over the manufacturing process in which the first moulding component is only partially cured in the first moulding process.

In the manufacturing processes described above, thermoset polymers are used in the first and second moulding compounds. Alternatively, thermoplastic polymers may be used in the first and second moulding compounds. The manufacturing process using thermoplastic polymers is substantially as described above, except that heating of the first and second moulding compounds must be done differently. Typically, the first moulding compound with the directional fibre reinforcing material will be applied to the carrier tool. The carrier tool and the applied first moulding compound are heated to above the meting temperature of the first polymer, and are then placed in a cold mould. The mould is then closed and the first moulding compound is allowed to freeze, thus forming the first moulding, which adheres to an inner surface of the mould.

The mould is then opened and the carrier tool is removed, leaving the formed first moulding component adhered to the mould. The second moulding compound, for example in the form of sheet moulding compound, is then heated to above the meting temperature of the second polymer, and the heated introduced into the mould second moulding compound is placed in the cold mould. Again the mould is closed, which forms the second moulding compound into the required shape to form the second moulding component and adheres the second moulding component to the first moulding component. The second moulding compound is allowed to freeze, thus completing the moulded article. Finally, the mould is opened and the moulded article is removed from the mould. The moulded article has a main body component that is made of sheet moulding compound, and directional reinforcing elements on one or both sides of the moulded article 14, that provide increased strength and stiffness to the moulded article 14 in selected locations.

Figure 2:
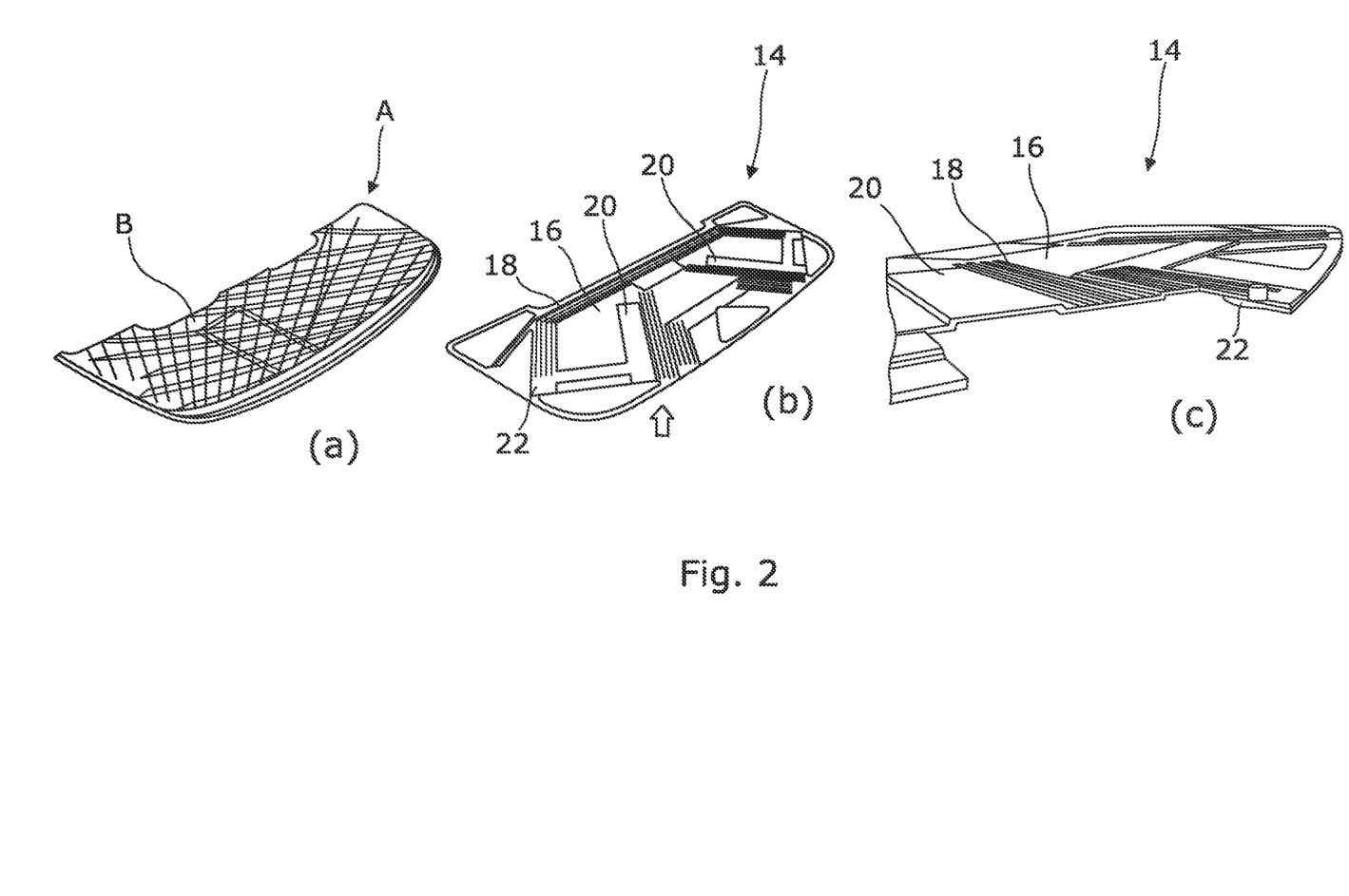
Figure 3:
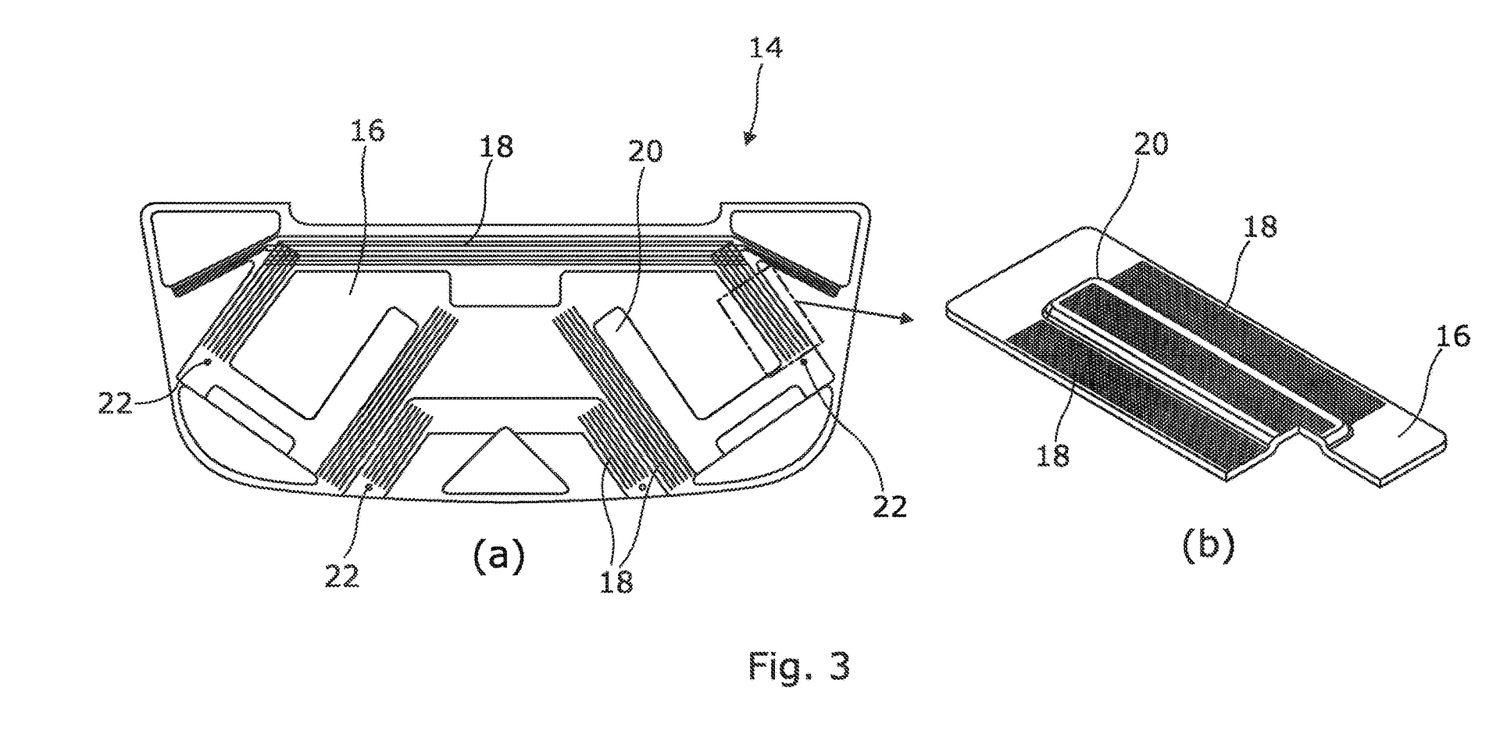

The invention is also applicable to the manufacture of moulded articles using an injection moulding process. In this case, the initial steps may be substantially as described above in relation to FIGS. 1a to 1c. However, after removing the carrier tool 8 from the mould as shown in FIG. 1c, the mould is closed and an injectable second moulding compound is then injected into the mould to fill the mould cavity. The thermoset polymers of the first and second moulding compounds then cure and cross-link, forming the finished moulded article that has a main body made of the second moulding compound and one or more reinforcing elements applied to a surface of the main body. Alternatively, if thermoplastic polymers are used, the polymers are allowed to cool and set before the moulded article is removed from the mould. FIGS. 2 and 3 illustrate one example of a moulded article 14 made by the method described above. In this case the moulded article 14 comprises a tonneau cover for covering the stowed roof of a convertible car. FIG. 2a illustrates a prior art tonneau cover A made of magnesium alloy, which has numerous ribs B on its lower surface for strength and stiffness (the cover is shown upside down). FIGS. 2b, 2c, 3a and 3b illustrate an equivalent moulded tonneau cover 14 made by the method described above.

As shown most clearly in FIGS. 3a and 3b, the moulded tonneau cover 14 includes a main body 16 and a plurality of reinforcing elements 18, which are attached to the lower surface of the main body 16 (the tonneau cover 14 is shown upside down). In this example, the main body 16 is made from sheet moulding compound and includes a non-directional carbon fibre reinforcing material, and the reinforcing elements 18 comprise uni-directional carbon fibre reinforcing fibres in a polymeric matrix. The reinforcing elements 18 are bonded to the main body 16 in positions where maximum strength and stiffness are required, and are not provided in locations that do not require such a high level of strength and stiffness. This ensures that the cover 14 has the required performance characteristics, and remains of low weight and relatively low cost.

It should be noted that in this embodiment the main body 16 is not flat, but instead includes a number of formations 20 in the form of strengthening beads that extend perpendicular to the plane of the cover 14. The formations 20 are designed to further increase the strength and stiffness of the cover 14.

The cover 14 also includes a number of auxiliary components, e.g. metal fasteners 22, which may be used for fastening the cover to the body of a car. One of the fasteners 22 is shown in a cut away portion of the cover in FIG. 2c. The fasteners 22 are moulded into the cover 14 during the manufacturing process, as described above in relation to FIG. 1d.

Figure 4:
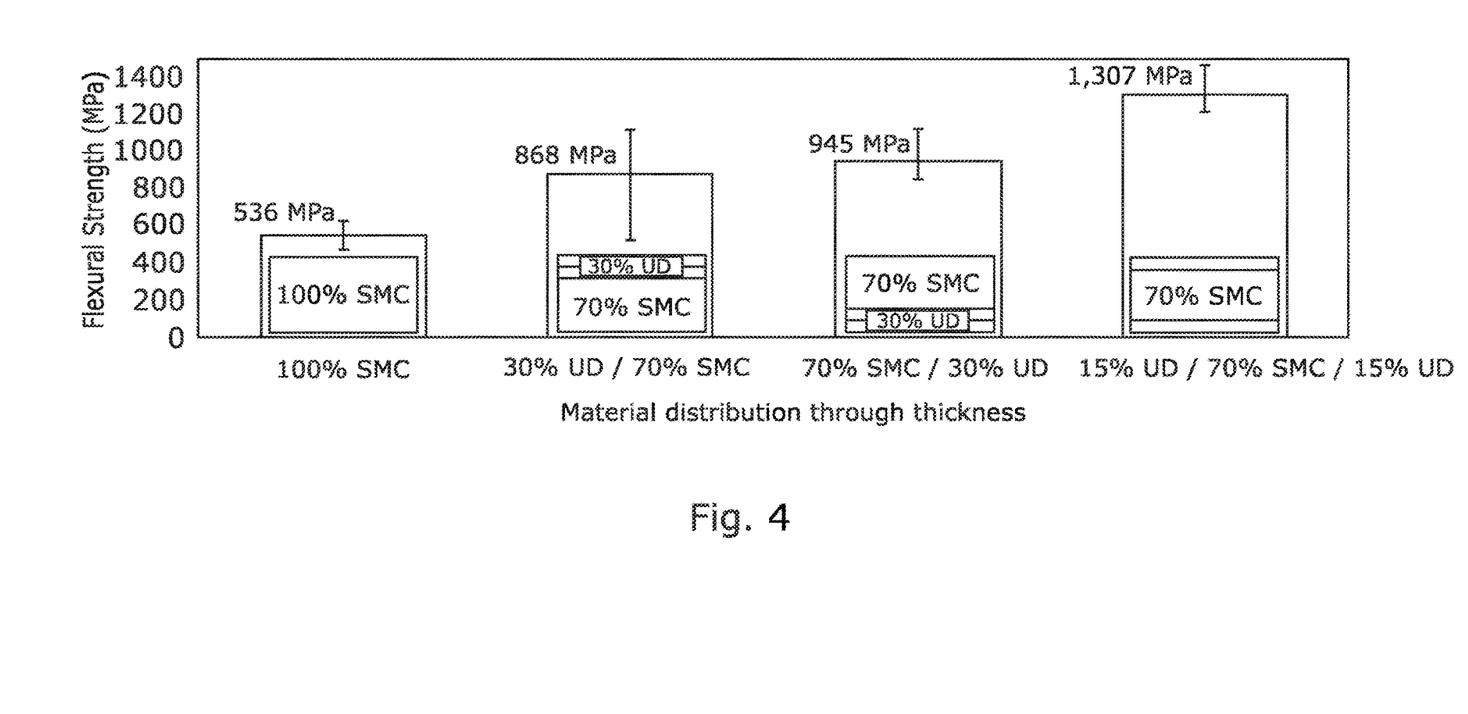
FIG. 4 illustrates the results of tests to measure the flexural strength of moulded articles having different constructional configurations.

The results of tests to measure the flexure strength of moulded articles made by the process described above are illustrated in FIG. 4. Flat samples of the material were tested using a three point bending test. In FIG. 4, the first column illustrates for comparative purposes the test results for a sample comprising 100% sheet moulding compound (SMC), whereas the second, third and fourth columns show the flexure strength for three samples of material made by the described process, comprising a main body of SMC and one or two layers of uni-directional carbon fibre reinforcing material (UD) applied to one or both sides of the SMC main body. As indicated in FIG. 4, the comparative sample made of 100% SMC had a strength of 536 MPa, a sample comprising 70% SMC and 30% UD in a double ply layer on the upper surface of the SMC (column 2) had a strength of 868 MPa, a sample comprising 70% SMC and 30% UD in a two ply layer on the lower surface of the SMC (column 3) had a strength of 945 MPa, and a sample comprising 70% SMC and 2 single ply layers of UD on the upper and lower faces of the SMC (column 4) had a strength of 1307 MPa. It appears from these tests that the symmetrical arrangement shown in column 4 is by far the best solution, both in performance and consistency.

Figure 5:
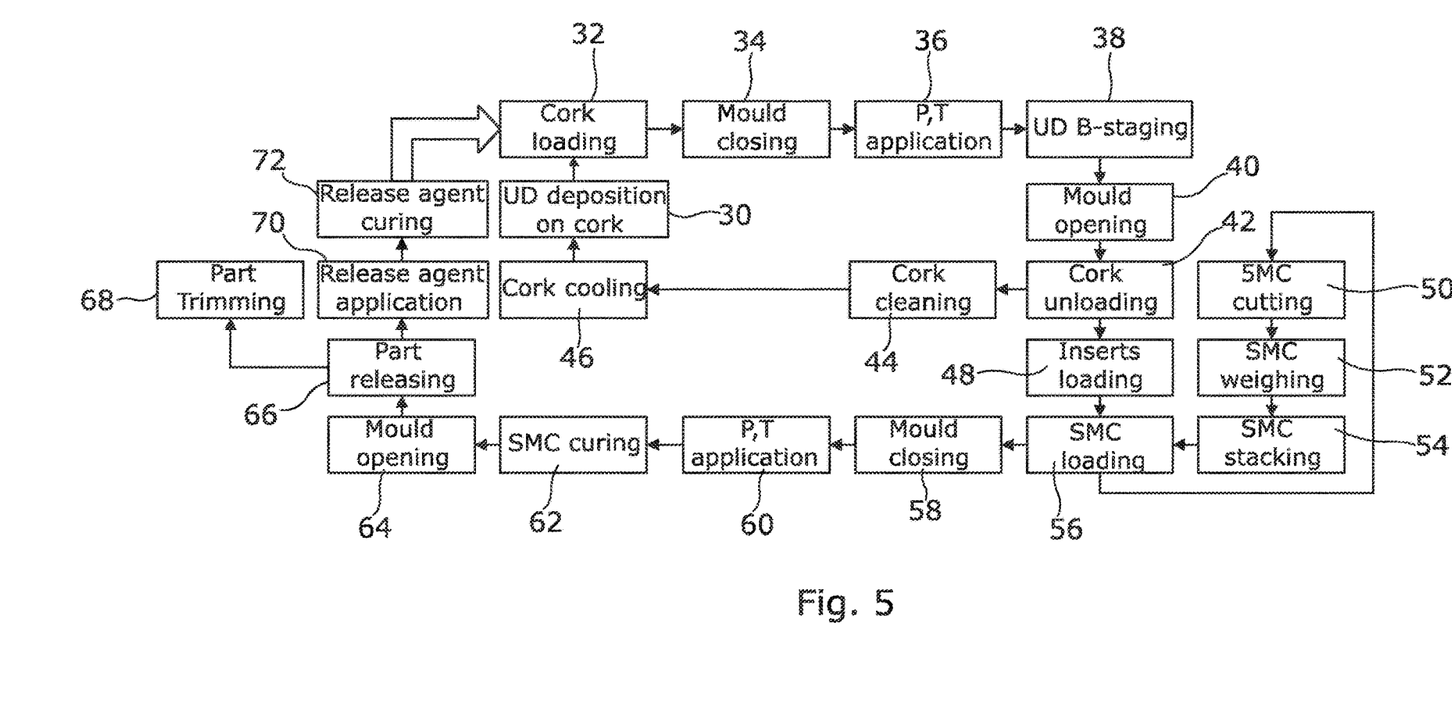
FIG. 5 is a process diagram illustrating the steps of a manufacturing process for manufacturing a moulded article.

FIG. 5 illustrates the steps of a process for manufacturing moulded articles according to an embodiment of the invention, which may optionally be fully or partially automated.

Starting at step 30, the first moulding component comprising a directional fibre reinforcement (indicated as "UD")

is deposited on the carrier tool (indicated as "cork"). The carrier tool is then loaded at step 32 into the mould, which is closed at step 34. A first moulding process comprising a first combination of time, temperature and pressure ($t_1$, $T_1$, $P_1$) is applied at step 36. This partially cures the first moulding component (indicated as "UD B-staging"); step 38. The mould is opened at step 40 and the carrier tool ("cork") is unloaded from the mould: step 42. The carrier tool is cleaned and allowed to cool, ready for re-use: steps 44,46.

After the carrier tool has been removed from the mould in step 42, auxiliary components such as metal inserts (if required) may be placed in the mould in the appropriate locations: step 48. Meanwhile, the second moulding component that comprises a non-directional fibre reinforcing material, for example SMC, is prepared by cutting the second moulded component to the desired shape to match the shape of the mould: step 50. The second moulding component is then weighed for accuracy and stacked ready for use: steps 52, 54.

In step 56 the second moulding component is loaded into the mould, and the mould is then closed: step 58. A second moulding process comprising a second combination of time, temperature and pressure ($t_2$, $T_2$, $P_2$) is applied at step 60. This cures the second moulding component and completes curing of the first moulding component, and causes cross-linking between the first and second moulding components to form the finished moulded article: step 62.

The mould is opened at step 64 and the moulded article is released at step 66. The moulded article may then undergo finishing operations including for example trimming away excess flash, at step 68. The mould is then prepared for another moulding operation by applying a release agent at step 70 and allowing the release agent to cure at step 72. This process may then be repeated as necessary.

Preferably the first and second moulding processes (steps 36 and 60) are carried out at the same mould temperature ($T_1=T_2$), thus avoiding the need to adjust the temperature of the mould, which is important for energy efficiency. The pressure applied to the mould in both moulding processes may also be the same ($P_1=P_2$). Usually, only the duration of the first and second processes is different, the duration generally being shorter for the first moulding process (step 36) and longer for the second moulding process (step 60).

As an illustrative and non-limiting example, the first moulding process may have a duration of one minute and the second moulding process may have a duration of about three minutes. More generally, if the time and pressure in the first and second moulding processes are the same, the duration $t_2$ of the second moulding process 60 may be related to the duration $t_1$ of the first moulding process 36 by the relationship $t_2=m \cdot t_1$, where the multiplier m has a value in the range 1.5-10, preferably 2-5.

Figure 6:
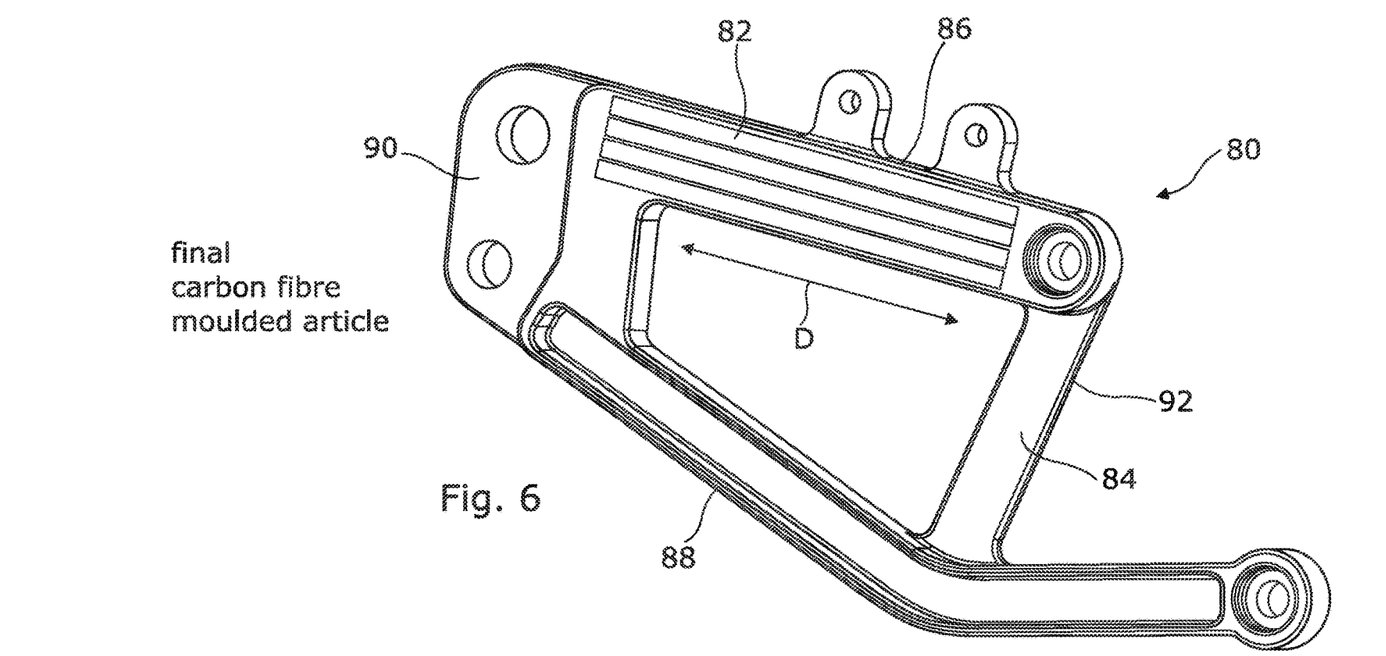
FIG. 6 is an isometric view of a moulded article with a unidirectional fibre reinforcing element.

FIG. 6 is an isometric view of a moulded article 80 with a unidirectional fibre reinforcing element 82, and FIG. 7 is an isometric view of a carrier tool 84 carrying the unidirectional fibre reinforcing element 82.

The unidirectional fibre reinforcing element 82 is made of a first moulding compound that comprises a first polymer and a first fibre reinforcing material embedded within the first polymer. The first fibre reinforcing material is a directional fibre reinforcing material that includes, in this case, a plurality of continuous reinforcing fibres that extend preferentially in at least one primary reinforcement direction D within the first moulding compound.

The moulded article 80 comprises a main body 84 that is made of a second moulding compound comprising a second polymer and a second fibre reinforcing material embedded within the second polymer. The second fibre reinforcing material is a non-directional fibre reinforcing material that includes a plurality of reinforcing fibres that extend in multiple directions within the second moulding compound.

In this case the moulded article 80 is a load-bearing frame structure that includes an upper element 86, a lower element 88 and two transverse elements 90, 92 that interconnect the upper element 86 and the lower element 88. The upper element 86 has the greatest load bearing requirement and is subjected in use to tensile forces acting in the direction of the longitudinal axis of the upper element. The reinforcing fibres of the unidirectional fibre reinforcing element 82 are orientated such that the primary reinforcement direction D extends parallel to the longitudinal axis of the upper element 86, in order to increase the strength and stiffness of the upper element 86 in the load bearing direction.

As can be seen in FIGS. 6 & 7, the carrier tool 84 mimics the shape of the upper element 86 of the moulded article 80. The unidirectional fibre reinforcing element 82 is attached to the surface of the carrier tool 84 in the position where it is to be placed on the surface of the moulded article. This ensures that when the carrier tool 84 and the attached unidirectional fibre reinforcing element 82 are placed in the mould for the first moulding process, the unidirectional fibre reinforcing element 82 is located in precisely the right position within the mould, so that it is correctly located on the surface of the moulded article 80. The carrier tool 84 is made, for example, from silicone rubber.

The invention claimed is:

1. A method of manufacturing a moulded article from first and second moulding compounds, wherein:

the first moulding compound comprises a first polymer and a first fibre reinforcing material embedded within the first polymer, wherein the first fibre reinforcing material is a directional fibre reinforcing material that includes a plurality of reinforcing fibres that extend preferentially in at least one primary reinforcement direction within the first moulding compound, and the second moulding compound comprises a second polymer and a second fibre reinforcing material embedded within the second polymer, wherein the second fibre reinforcing material is a non-directional fibre reinforcing material that includes a plurality of reinforcing fibres that extend in multiple directions within the second moulding compound, the method comprising:

attaching a first moulding component to a carrier tool, said first moulding component comprising said first moulding compound, placing the carrier tool and the attached first moulding component in a mould comprising first and second mould parts that are configurable in opened and closed configurations, wherein a mould cavity is defined between the first and second mould parts in the closed configuration, closing the mould and applying a first moulding process, so that the first moulding component adheres to the first mould part, opening the mould and removing the carrier tool while leaving the first moulding component adhered to the first mould part, either (i) placing a second moulding component in the mould, said second moulding component comprising said second moulding compound, then closing the mould, or (ii) closing the mould, then injecting a second moulding component into the mould, said second moulding component comprising said second moulding compound, applying a second moulding process to shape the first and second moulding components to the mould cavity, and bond the first moulding component to the second moulding component to form a moulded article, and opening the mould and removing the moulded article.

2. A method of manufacturing a moulded article according to claim 1, comprising:

attaching first moulding components to opposite sides the carrier tool, each of said first moulding components comprising said first moulding compound, placing the carrier tool and the attached first moulding components in the mould, closing the mould and applying the first moulding process, so that at least one first moulding component adheres to the first mould part and at least one first moulding component adheres to the second mould part, opening the mould and removing the carrier tool while leaving the first moulding components adhered to the first and second mould parts, and either (i) placing the second moulding component in the mould, then closing the mould, or (ii) closing the mould, then injecting a second moulding component into the mould, said second moulding component comprising said second moulding compound, applying the second moulding process to shape the first and second moulding components to the mould cavity, and bond the first moulding components to opposite sides of the second moulding component to form a moulded article, and opening the mould and removing the moulded article.

3. A method of manufacturing a moulded article according to claim 1, wherein the first moulding component is substantially laminar.

4. A method of manufacturing a moulded article according to claim 1, wherein the first moulding compound includes a uni-directional fibre reinforcing material comprising a plurality of reinforcing fibres that extend substantially parallel to a primary reinforcement direction.

5. A method of manufacturing a moulded article according to claim 1, wherein the first fibre reinforcing material includes continuous reinforcing fibres having a length of at least 50 mm.

6. A method of manufacturing a moulded article according to claim 1, wherein the moulded article is formed using a compression moulding process.

7. A method of manufacturing a moulded article according to claim 6, wherein the second moulding component is substantially laminar.

8. A method of manufacturing a moulded article according to claim 6, wherein the second moulding component comprises a sheet moulding compound.

9. A method of manufacturing a moulded article according to claim 1, wherein the moulded article is formed using an injection moulding process.

10. A method of manufacturing a moulded article according to claim 9, wherein the second moulding component comprises an injectable moulding compound.

11. A method of manufacturing a moulded article according to claim 1, wherein the second moulding compound includes reinforcing fibres having a fibre length in the range of 1-100 mm.

12. A method of manufacturing a moulded article according to claim 1, wherein the first and second polymers comprise thermoset polymers.

13. A method of manufacturing a moulded article according to claim 12, wherein the first moulding process partially cures the first moulding compound and the second moulding process fully cures the first and second moulding compounds.

14. A method of manufacturing a moulded article according to claim 12, wherein the first moulding process fully cures the first moulding compound and the second moulding process fully cures the second moulding compound.

15. A method of manufacturing a moulded article according to claim 1, wherein the first and second polymers comprise thermoplastic polymers.

16. A method of manufacturing a moulded article according to claim 15, including heating the first and second polymers before placing the first and second polymers in the mould.

17. A method of manufacturing a moulded article according to claim 1, wherein the first moulding process comprises a first combination of temperature $T_1$, pressure $P_1$ and time $t_1$, and the second moulding process comprises a second combination of temperature $T_2$, pressure $P_2$ and time $t_2$.

18. A method of manufacturing a moulded article according to claim 17, wherein $T_1=T_2$.

19. A method of manufacturing a moulded article according to claim 17, where $P_1=P_2$.

20. A method of manufacturing a moulded article according to claim 17, wherein $t_2=m \cdot t_1$ where m is in the range 1.5-10.

21. A method of manufacturing a moulded article according to claim 1, wherein the carrier tool comprises an elastomeric material.

22. A method of manufacturing a moulded article according to claim 1, wherein the carrier tool is substantially laminar.

23. A method of manufacturing a moulded article according to claim 1, wherein the carrier tool has a thickness that is equal to or greater than the height of the mould cavity at the location of the carrier tool, so that the carrier tool is compressed within the mould cavity when the mould is in a closed configuration.

24. A method of manufacturing a moulded article according to claim 1, including placing auxiliary components of the moulded article in the mould after removing the carrier tool and before placing or injecting the second moulding component into the mould.

* * * * *